United States Patent Office 2,902,370
Patented Sept. 1, 1959

2,902,370

PACKAGED HONEY AND METHOD OF PACKAGING SAME

Jonathan W. White, Jr., Willow Grove, Pa., assignor to the United States of America as represented by the Secretary of Agriculture No Drawing. Application April 24, 1953
Serial No. 351,059

3 Claims. (Cl. 99—171)

(Granted under Title 35, U.S. Code (1952), sec. 266)

A non-exclusive, irrevocable, royalty-free license in the invention herein described, throughout the world for all purposes of the United States Government, with power to grant sublicenses for such purposes, is hereby granted to the Government of the United States of America.

This invention relates to packaged chunk comb honey and to the prevention or delaying of crystallization or granulation of such honey.

In the packing of the choicer grades of honey it is common practice to put chunks of comb honey in glass jars and then complete the filling of the jar with extracted (liquid) honey. A serious objection to this procedure has been that granulation seriously limits the shelf life of such honey.

An object of this invention is to provide a method for delaying granulation in packaged chunk comb honey. Another object is to provide packaged chunk comb honey having increased shelf life by reason of delayed granulation.

Most honey is a super-saturated solution with respect to one or more of the sugars present. It is well known that such super-saturated solutions may be kept in a liquid state for prolonged periods provided that crystallization nuclei are excluded but that they quickly crystallize or granuate if such nuclei are present.

The undesirable granulation so often observed in packaged honey containing chunks of comb honey is believed to be initiated and/or accelerated by the presence of crystallization nuclei on, or introduced with the comb. Such nuclei probably are tiny crystals produced by drying of honey on the comb. In the case of liquid honey it is a simple matter to eliminate such nuclei by filtration or by heating to a suitable temperature whereby the crystals are fused or dissolved. Obviously this cannot be done with comb honey.

According to my invention, the comb honey is coated with a solid film of edible material and thus is segregated in the package from the surrounding liquid honey. The latter is thus protected from any crystallization nuclei carried by the former. Granulation is thus greatly retarded and shelf life is correspondingly increased.

The coating material I use is a soluble pectinate film which, being edible, odorless, and substantially tasteless, is eaten with the honey without being detectable. The composition and procedure used are substantially those described by Owens and Schultz in U.S. Patent 2,517,595.

It is well known that pectins and pectinates vary widely in methoxyl content, molecular weight, gel strength and other properties. These variables are of importance in my invention only in that suitable allowances must be made in the dipping bath composition and in the procedure used so that a continuous film of suitable thickness is produced on the comb.

In addition to the compositions and techniques described by Owens and Schultz we can use others, as is illustrated by the following example.

*Example 1*

Comb honey was cut in pieces to fit jars and drained 24 hours at 98° F. to remove surplus honey. Liquid honey from the same floral source was provided for completing the filling of the jars.

A pectinate coating bath was prepared as follows:

Ten grams of acid de-esterified pectinate of 4.2% methoxyl content was moistened with alcohol or mixed with an equal amount of granulated sugar to facilitate dispersion. It was then stirred into 500 ml. of water and heated with stirring to about 80° C. Then 15 ml. of 50% aqueous solution of citric acid was added. Heating was discontinued and 52.5 ml. of 1% aqueous calcium chloride solution was stirred in. The solution was then adjusted to 74–76° C. for dipping. The gel point of this solution was 60° C. and its pH was 2.4.

The chunks of drained comb honey were dipped by hand into the coating bath, the time of immersion being only about one second so that the wax of the comb was not melted. The pieces were placed on racks and left to dry. Then they were placed in the jars and covered with warm (45–60° C.) liquid honey. The filled jars were placed on their sides until cold in order to prevent distortion of the honeycomb.

Jars containing the treated comb and jars containing similarly packed but untreated comb honey were stored at 57° F. (optimum crystallization temperature) for an accelerated shelf life determination. The treated comb could be stored considerably longer than the untreated without showing objectionable granulation.

For best results, the coating bath should have a gel point of at least 40° C. and the dipping should be done at a temperature at least 10° C. above the gel point of the bath. The upper limit of the temperature of dipping is that at which excessive softening of the comb occurs and is in the neighborhood of 90° C.

The purpose of the citric acid used in the example above was to lower the pH and strengthen the pectinate film. In general, pectinate gels are stronger when acid than when near the neutral point. Some pectins and pectinates form sufficiently strong films in our process without addition of acid. When acid is to be added, any non-toxic acid permissible in foods may be used, as for instance, tartaric, malic, lactic or phosphoric acid.

As will be obvious to those skilled in the art, the concentration of the coating bath and its temperature, the type and source of pectin and its methoxyl content may be varied widely. The only limitations are that a continuous rapid-drying film over the comb must be produced and the comb must not be softened or distorted by heat.

Instead of combining the calcium salt solution and the pectinate solution, they may be used separately. The comb would be dipped first into the pectinate solution to produce a pectinate film. This would then be hardened by dipping in the solution of calcium salt. Instead of calcium chloride, any soluble non-toxic calcium salt may be used, as for instance, the acetate, lactate, nitrate, etc.

I claim:

1. Packaged honey consisting of chunk comb immersed in liquid honey, said chunk comb being coated with a continuous pectinate film.

2. The method of packaging chunk comb honey whereby granulation is delayed which method comprises coating the comb honey with a continuous pectinate film, placing the coated comb honey in containers, and then completing the filling of the containers with liquid honey.

3. The method of delaying granulation in chunk comb honey packed in liquid honey which method comprises dipping the comb honey in an aqueous dispersion of a pectinate containing calcium ions, thus to form a continuous solid film over the comb, and then packing the coated comb in liquid honey.

References Cited in the file of this patent

UNITED STATES PATENTS

| | | |
|---|---|---|
| 1,182,116 | Thornton | May 9, 1916 |
| 1,694,680 | Burton et al. | Dec. 11, 1928 |
| 2,052,358 | Lund | Aug. 25, 1936 |
| 2,295,274 | Walker | Sept. 8, 1942 |
| 2,517,595 | Owens et al. | Aug. 8, 1950 |
| 2,591,328 | Yanik | Apr. 1, 1952 |
| 2,611,708 | Owens et al. | Sept. 23, 1952 |

FOREIGN PATENTS

| | | |
|---|---|---|
| 756,434 | France | Sept. 25, 1933 |

OTHER REFERENCES

"Modern Packaging," September 1948, pp. 157 and 158.